US006697369B1

(12) United States Patent
Dziong et al.

(10) Patent No.: US 6,697,369 B1
(45) Date of Patent: Feb. 24, 2004

(54) ADMISSION CONTROL ADJUSTMENT IN DATA NETWORKS USING MAXIMUM CELL COUNT

(76) Inventors: Zbigniew Marek Dziong, 197 Thousand Oaks Dr., Atlantic Highlands, NJ (US) 07716; Wing Cheong Lau, 40 Victoria Dr., Eatontown, NJ (US) 07724

( * ) Notice: Subject to any disclaimer, the term of this patent is extended or adjusted under 35 U.S.C. 154(b) by 0 days.

(21) Appl. No.: 09/407,721

(22) Filed: Sep. 28, 1999

(51) Int. Cl.7 .............................................. H04L 12/28
(52) U.S. Cl. ................. 370/395.2; 370/395.21
(58) Field of Search ................. 370/229, 232, 370/230, 233, 234, 235, 360, 395.1, 397, 395.2, 399, 395.21, 395.3, 395.31, 395.41, 395.43, 395.51

(56) References Cited

U.S. PATENT DOCUMENTS

| 5,315,586 | A | | 5/1994 | Charvillat | |
|---|---|---|---|---|---|
| 5,357,507 | A | | 10/1994 | Hughes et al. | |
| 5,463,620 | A | * | 10/1995 | Sriram | 370/60 |
| 5,499,238 | A | * | 3/1996 | Shon | 370/60.1 |
| 5,570,360 | A | * | 10/1996 | Klausmeier et al. | 370/60 |
| 5,838,681 | A | * | 11/1998 | Bonomi et al. | 370/395 |
| 5,862,126 | A | | 1/1999 | Shah et al. | |
| 5,872,771 | A | | 2/1999 | Park et al. | |
| 5,878,029 | A | | 3/1999 | Hasegawa et al. | |
| 5,881,049 | A | | 3/1999 | Beshai et al. | |
| 5,917,804 | A | * | 6/1999 | Shah et al. | 370/230 |
| 5,953,338 | A | * | 9/1999 | Ma et al. | 370/395 |
| 6,215,768 | B1 | * | 4/2001 | Kim | 370/230 |

* cited by examiner

Primary Examiner—Wellington Chin
Assistant Examiner—Brenda Pham

(57) ABSTRACT

Tuning for connection admission control (CAC) algorithms in broadband ATM networks is accomplished using an overbooking technique based on aggregate effective bandwidth, AEBW, as an approximation to required bandwidth for given levels and classes of network traffic. An overbooking gain factor, $\alpha^r$, is developed—typically in a network operations system—based on long-term measurements supplied periodically by network switches. This overbooking gain is derived from a count of cells arriving in periodic time slots and is updated from time to time based on measurement values sent from individual switches to the operations system. Presently disclosed embodiments provide tools that can be used for tuning call/traffic admission control and for network bandwidth management and dimensioning purposes in a variety of packet-switched networks.

25 Claims, 4 Drawing Sheets

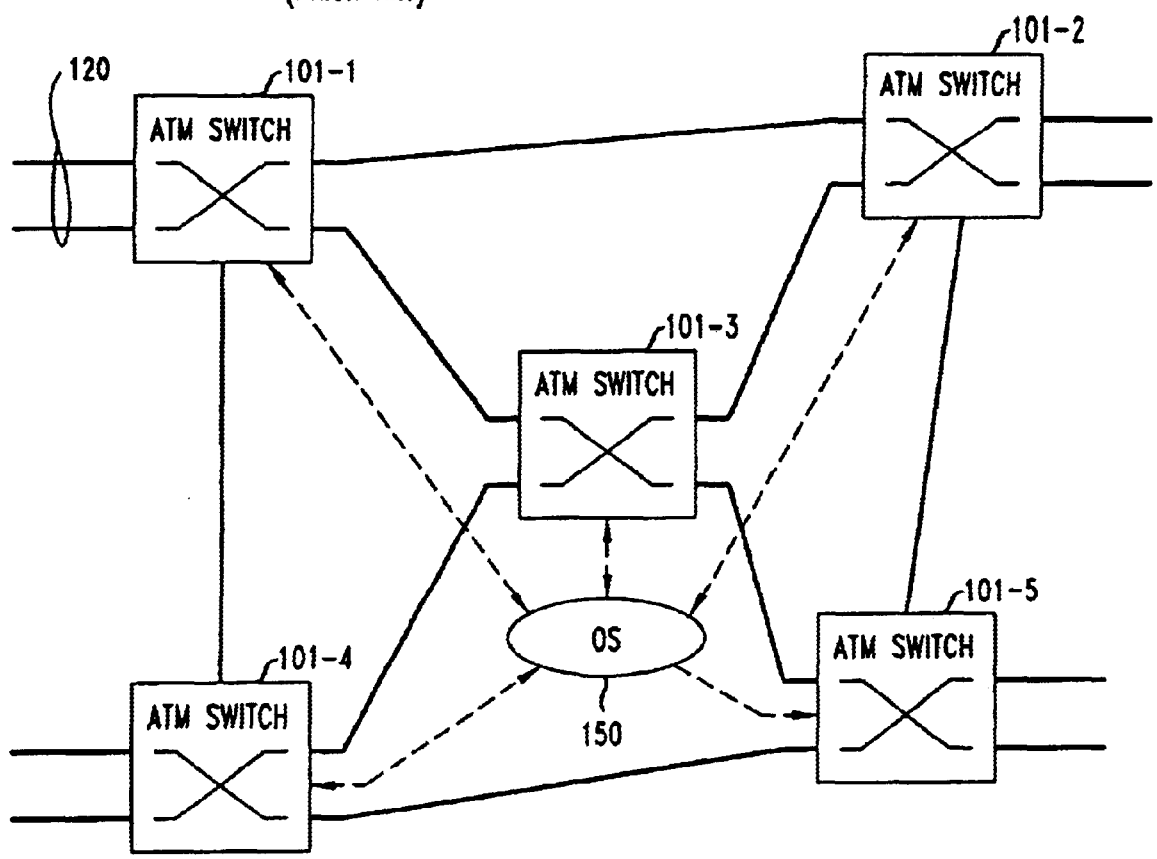
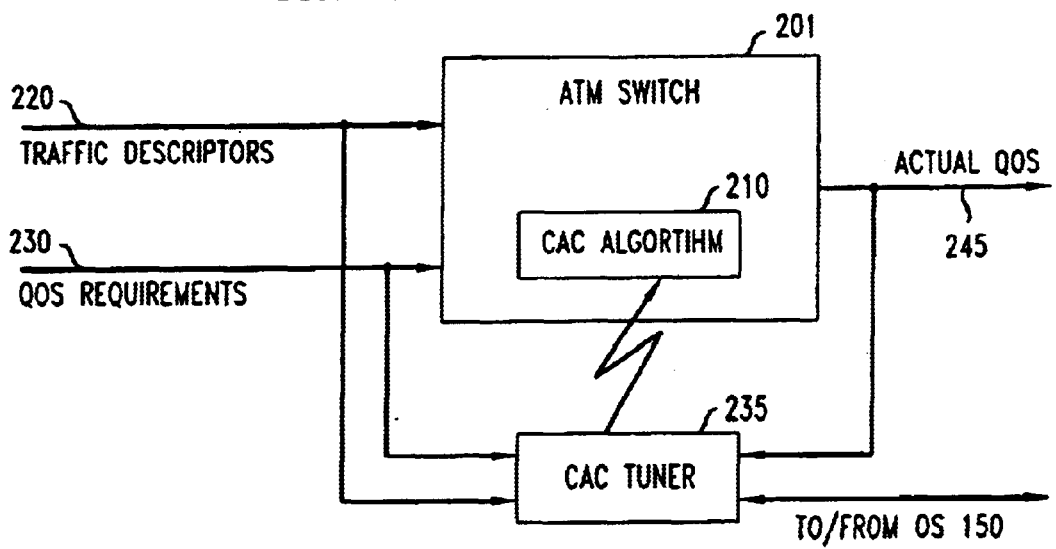

AEBW: AGGREGATE EFFECTIVE BANDWIDTH

MAXIMUM CELL COUNT APPROACH

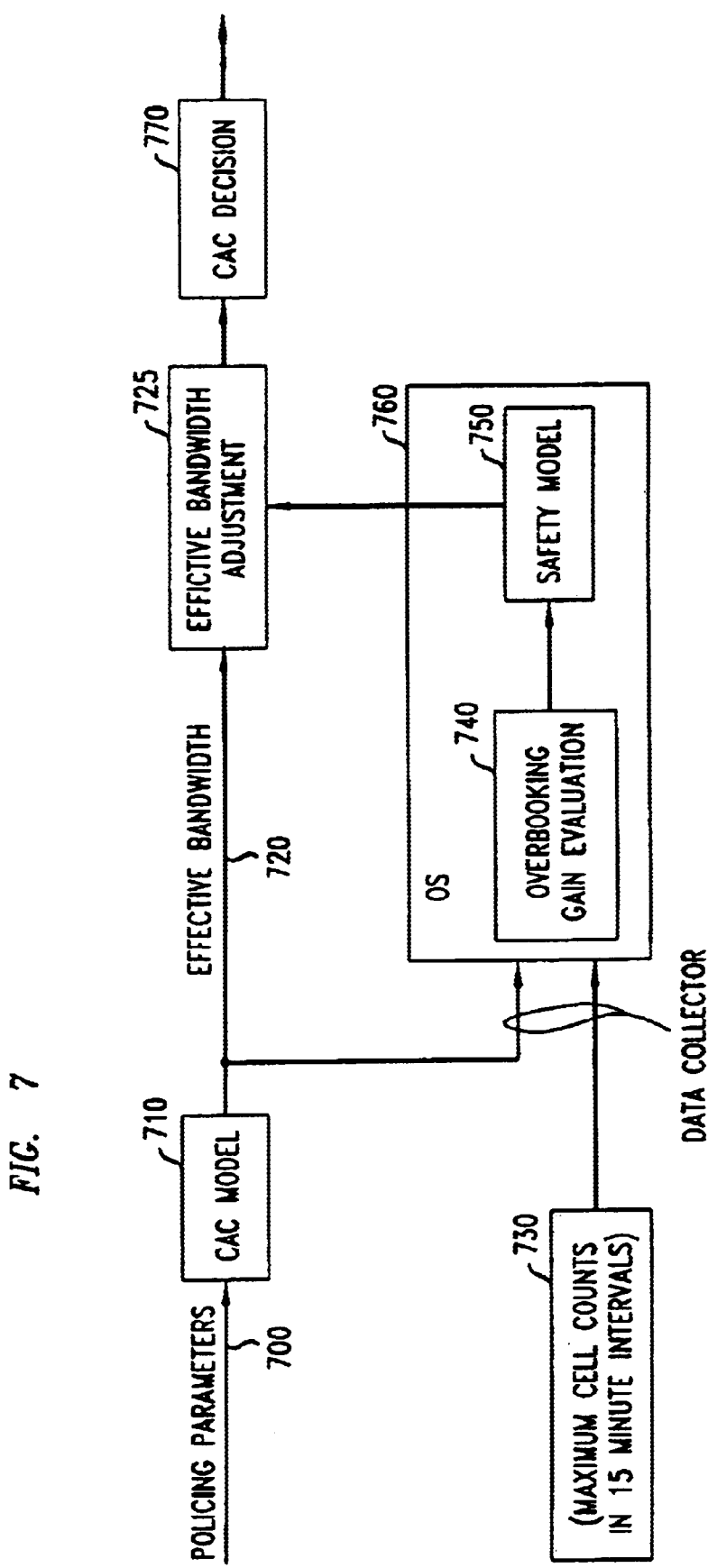

ADMISSION CONTROL ADJUSTMENT IN DATA NETWORKS USING MAXIMUM CELL COUNT

RELATED APPLICATIONS

The present invention is related to the following concurrently filed applications: Model-Based Admission Control Adjustment in Data Networks, by Z. Dziong; Learning-Based Admission Control Adjustment in Data Networks, by Z. Dziong and M. Ji. Each of these concurrently filed applications is assigned to the assignee of the present invention, and each is hereby incorporated by reference into the present application.

FIELD OF THE INVENTION

The present invention relates to high-speed data networks, such as Asynchronous Transfer Mode (ATM) networks. More particularly, the present invention relates to Admission Control for bandwidth management and congestion control in such networks.

Still more particularly, the present invention relates to the use of Connection Admission Control (CAC) adjustments in ATM networks using network measurement data to further control and tune an analytical CAC system.

BACKGROUND OF THE INVENTION

In broadband integrated services networks, e.g., those using asynchronous transfer mode (ATM) systems and techniques, information is packetized in fixed length "cells" for statistical multiplexing with other traffic for transmission over high-bit-rate channels. Such networks are connection oriented, so a connection must be established before transmission begins. Moreover, these connections are usually subject to contracts between a network operator and users of the network. To ensure quality of service (QoS) consistent with these contracts, connection admission control (CAC) techniques are typically employed in management of such networks. Generally, CAC algorithms determine whether a new virtual channel connection should be admitted to the network based on network status—such as available resources, cell loss performance—and contract parameters (e.g., mean traffic rate and peak traffic rate). See generally, Dziong, Z., ATM *Network Resource Management*, McGraw-Hill, 1997.

Because of the complex variety of connection types and services, and consequent difficulty in ascertaining complete and current information regarding the actual state of ATM networks, and because of possible adverse consequences of failing to honor QoS guarantees in customer contracts, many network operators have chosen to use CAC algorithms that are quite conservative. Most CAC algorithms are designed for worst-case source behavior. Moreover, analytical models applied in these algorithms are also conservative—to account for the difficulty in achieving exact modeling of the connection aggregate process. Such conservative approaches in many cases tend to offset statistical multiplexing gains and other system efficiencies available in ATM networks.

Some have proposed using actual network measurements (such as traffic level and cell-loss characteristics in light of corresponding QoS constraints) to adjust CAC mechanisms in an attempt to more fully use network resources. See, for example, Bensaou, B.; Lam, S. T. C.; Chu, H. and Tsang, D. H. K., "Estimation of the Cell Loss Ratio in ATM Networks with a Fuzzy System and Application to Measurement-Based Call Admission Control," *IEEE/ACM Transactions on Networking*, VOL. 5, NO. 4 (August 1997), pp. 572–584; Gibbens, R. J., Kelly, F. P., and Key, P. B., "A decision-theoretic approach to call admission control in ATM networks," *IEEE Journal on Selected Areas in Communication*, 13(6):1101–1114 (1995); and Saito, H. "Dynamic call admission control in ATM networks, *IEEE Journal on selected Areas in Communication*, 9(7):982–989 (1991).

Thus far however, attempts to use network operating measurements have proven difficult in network administration, especially in respect of their incorporation in CAC processes. A particular difficulty arises in some prior art CAC processes in efficiently treating operations in networks exhibiting a wide variety of traffic types with a concomitant variety of QoS constraints. High bandwidth efficiencies through CAC tuning have not been readily available without high precision measurements.

SUMMARY OF THE INVENTION

The present invention overcomes limitations of prior art CAC algorithms and achieves a technical advance, as described in connection with illustrative embodiments presented below.

In accordance with one aspect of the present invention, the concept of aggregate effective bandwidth, AEBW, is used to provide a useful approximation to required bandwidth for given levels and classes of network traffic. AEBW is used in deriving an allowed level of overbooking—expressed in terms of an overbooking gain, $\alpha^r$.

In accordance with another aspect of the present invention, an estimate is made of the probability distribution function for a maximum equivalent bandwidth, typically in the context of a network operations system, to provide information to switches to control over-booking gain. This over-booking gain is derived from a count of cells arriving in periodic time slots and is updated from time to time based on measurement values sent from individual switches to the operations system. Time slots duration for the counts is illustratively chosen in accordance with buffer length at ports of the switches.

In illustrative operation, a maximum of counts determined during a representative 15-minute interval and is sent to the operations system. Only the maximum count need be sent. From the individual measurements, the operations system estimates the probability distribution function by histograms of the measured values.

The presently disclosed embodiments provide tools that can be used for tuning call/traffic admission control and for network bandwidth management and dimensioning purposes. While the proposed methods and systems are described in the context of ATM network links, embodiments of the present invention are applicable to any packet-switched network.

BRIEF DESCRIPTION OF THE DRAWING

The above-summarized invention will be more fully understood upon a consideration of the following detailed description taken together with the attached drawing, wherein:

FIG. 1 shows a simplified representation of a network of interconnected switches communicating with an operations system. Such a network provides a context in which illustrative embodiments of the present invention find application.

FIG. 2 shows a CAC tuner operating in conjunction with a switch-based CAC algorithm in accordance with one aspect of the present invention.

FIG. 7 shows an illustrative system for carrying out the maximum cell count algorithms.

DETAILED DESCRIPTION

Figure 3A:
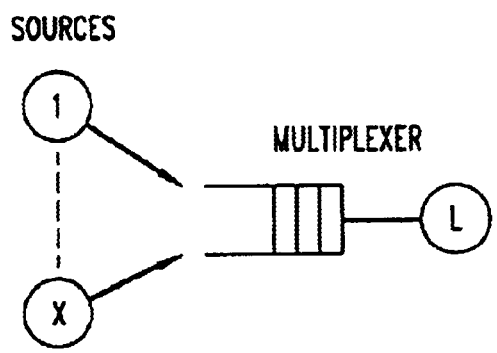
FIGS. 3A and 3B help illustrate the derivation of the concept of aggregate effective bandwidth, AEBW.

FIG. 1 shows a simplified representation of a network of ATM switches interconnected by data links in which illustrative embodiments of the present invention will find application. Each of the ATM switches 101-i, i=1, 2, . . . , N includes a plurality of input ports receiving input traffic streams from respective data sources, including output ports of other switches. Connections established through individual input ports generally reflect a variety of traffic forms, including permanent virtual connections (PVCs) or switched virtual connections (SVCs). Such input connections through input ports are represented collectively as 120 for illustrative switch 101-1. Though the number of switches, N, is shown as being equal to five for the illustrative network of FIG. 1, it will be understood that N may be any integer consistent with geographic and traffic requirements of a network. In general, each individual input stream will be subject to quality of service (QoS) constraints such as limits on cell loss, maximum cell delay and other such constraints known in the art.

Each ATM switch 101-i in FIG. 1 has a plurality of output ports, each connected over physical links to respective input ports of other ATM switches 101-i, or to other networks or to multiplexers, terminals or other terminating devices or systems. Each of these output ports, in turn, will generally support a plurality of virtual connections that include links to the connected following switch. Additionally, of course, ATM switches 101-i shown in FIG. 1 typically comprise processor, buffering, switching fabric and other facilities normally found in ATM network switches.

Each ATM switch 101-i advantageously comprises facilities for monitoring switch and link activities and for controlling link operation under the direction of switch operating software executing on a processor at the switching node. Such software includes CAC control software for allowing or disallowing new or modified connections through the switch. Those skilled in the art will recognize that existing switch software is readily modified, based on present teachings, to achieve innovations and advantages of the present invention. In some cases a separate CAC tuning module at a switch directed to receiving tuning parameters and/or other control information from Operations System (OS) 150 and supplying data and control information to existing CAC algorithm software will prove preferable.

In some cases, the determination of tuning parameters will be accomplished at the switch itself, as an alternative to determining them at the OS 150 for delivery to individual switches. This is in contrast to operation of the CAC tuning methods taught in the incorporated patent application entitled Learning-Based Admission Control Adjustment in Data Networks, where determination of tuning information is preferably performed at a network OS and delivered to individual switches. In any event, functionality relating to actual CAC tuning in accordance with the present inventive teachings is advantageously performed at network switches in accordance with present inventive teachings, as described below. In some cases human operators can manually apply tuning information derived in accordance with the present invention (and/or using the teachings of one or more of the incorporated patent applications). So, the actual tuning at network switches can be logically considered in terms of a tuning knob that is responsive directly or indirectly to tuning parameters and/or other information derived in accordance with the present inventive teachings or those of the incorporated patent applications.

As is well known, control of switch functionality in switches 101-i in FIG. 1 is advantageously grouped in so-called control and management planes in the switches. In accordance with common reference models for ATM network operations (such as CCITT Rec. I.321, 1991), communications protocols are referred to layers, including physical layer, ATM layer and ATM Adaptation Layer (AAL)—as well as higher layers. Each of these layers is then subject to management functions exercised by control and management planes, such controls typically include policing mechanisms for ensuring that cell streams conform to existing user contracts and scheduling algorithms for output ports. The control plane is typically used to signal between management objects at different physical locations, such as network nodes and user premises. See, for example, the above-cited Dziong book, especially pp. 5–9.

CAC algorithms usually decompose a connection admission problem into a number of link problems each dealing with traffic conditions and QoS parameters associated with links connecting an output port at one ATM switch to an input port at another ATM switch. Using well known monitoring, signaling and control functions of the aforementioned control and management planes, CAC algorithms at individual ATM switches control admission (or not) of newly presented connections (or connections seeking renegotiated service levels). As noted above, however, these CAC algorithms are often unduly conservative in their execution and therefore subject to operation at higher efficiencies when adjusted or tuned in accordance with the present inventive teachings.

Operations systems such as OS 150 shown in FIG. 1 are generally well known in the art. Such OSs perform many supervisory, billing and administrative functions in modern networks. In the context of FIG. 1 and the teachings of the present invention, OS 150 is arranged to receive traffic measurement and connection information from the several switches in the network and determine appropriate parameters for use at the switches in introducing controlled overbooking to achieve fuller use of the network facilities.

FIG. 2 shows an overall representation of an ATM switch 201 receiving traffic descriptors over input 220 and QoS requirements over input 230. This illustrative input information is used for, among other things, making CAC decisions using CAC algorithm 210. Some or all of the information appearing on inputs 220 and 230, as well as information relating to cell process performance at output ports, such as port 245 of switch 201, are also supplied to OS 150. CAC tuner 235, in accordance with an aspect of the present invention receives control information from OS 150 (based on longer-term network performance) regarding adjustments to be made to overbooking gain in administering the CAC processing at switch 201. CAC tuner 235, in turn, receives this additional information and operates in accordance with a CAC tuner algorithm, which may assume any of a number of particular designs in achieving modifications to the operation of CAC algorithm 210. The manner in which such tuning or modification is performed in accordance with illustrative embodiments of the present invention will be described below.

A Definitional Framework for Viewing CAC Adjustments

Before proceeding with a detailed description of illustrative control algorithms, it proves convenient to define terms used in the following description, to more formally state the CAC adjustment problem and to describe certain preliminary aspects of embodiments of the present invention.

Figure 3B:
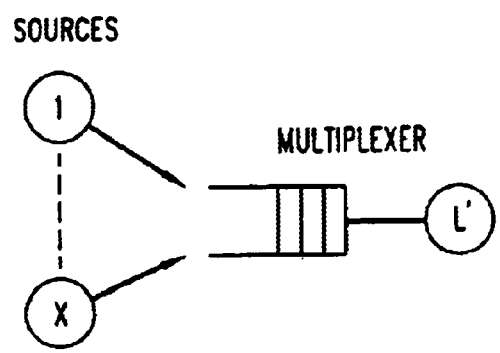

A first concept to be introduced is that of aggregate effective bandwidth, AEBW. For ease of presentation we consider first a one-priority case (a generalization to the multi-priority case will be given below). The definition is illustrated in FIGS. 3A and 3B. In FIG. 3A a plurality of connections are served in an ATM multiplexer characterized by link speed L Under the assumption that the QoS constraints are not violated, we reduce the link speed to value L', as in FIG. 3B, at which speed the QoS constraints are tightly met. In other words, any further reduction of the link speed below L' would violate one or more of the QoS constraints. In the following we refer to L' as aggregate effective bandwidth, AEBW.

It also proves convenient to introduce the following notation for values associated with a particular switch output port for a particular state of connections:

$D^d$—nominal effective bandwidth allocated by CAC for priority j aggregate traffic based on source declared parameters (consistent with policing parameters—worst case);

$D^{ap}$—maximum actual effective bandwidth (based on exact model) required by priority j worst case aggregate traffic (consistent with policing parameters);

$D^a$—actual effective bandwidth required by aggregate traffic (smaller than $D^{ap}$ if sources' activity is intermittent and/or the declared parameters were "oversized");

$D^t=D^d/(\alpha^t+1)$—tuned effective bandwidth for aggregate traffic; ($\alpha^t$ is referred to as the over-booking gain);

$D^{ov}=D^{ap}-D^a$—bandwidth available for over-booking;

$E^{CAC}=D^d-D^{ap}$—CAC model error; (this is most likely positive);

$E^t=D^t-D^a$—tuned CAC error; (an objective is to keep this error small but positive).

Figure 4:
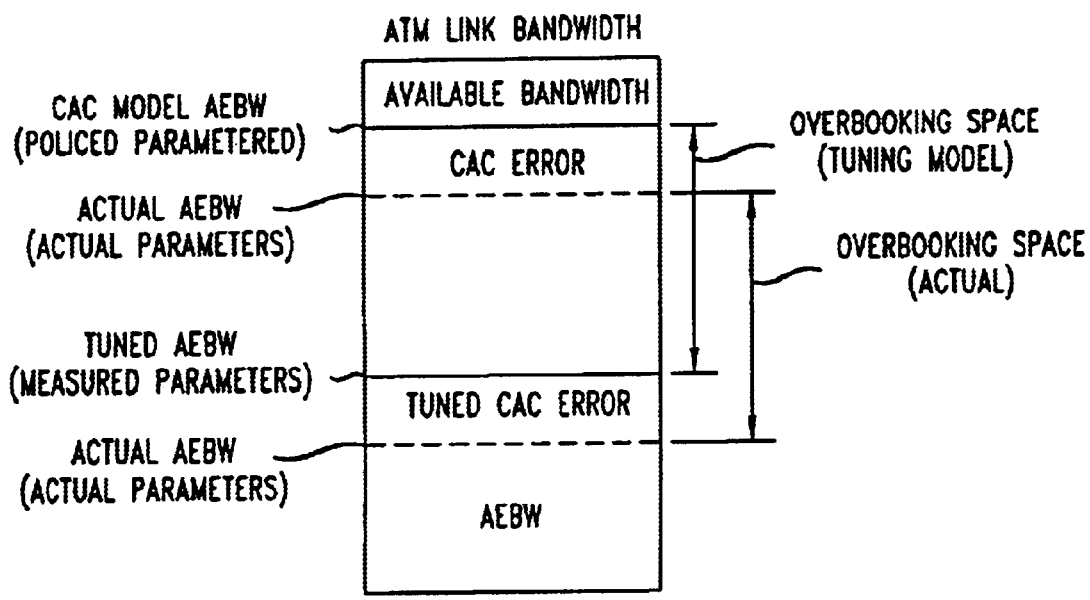
FIG. 4 shows available bandwidth in relation to total link bandwidth, AEBW and other bandwidth components.

The relation between these values is illustrated in FIG. 4 for a particular set of connections at a particular moment (assuming one priority class). Observe that the difference between the nominal effective bandwidth, $D^d$, and the actual bandwidth, $D^a$, is caused by two independent factors: CAC model error and source inactivity (especially PVCs which seek parameters based on peak activity periods, but which generally do not require these peak parameters at all times). For these reasons it is generally appropriate to consider the following objectives of CAC tuning:

OB1—reduce the CAC algorithm error

OB2—utilize the bandwidth available for over-booking (over-booking bandwidth);

OB3—reduce the CAC error and utilize the over-booking bandwidth

While the third objective is generally a preferred one, some solutions are limited to the second objective because of measurement or model limitations. Note that the first objective requires that all sources are using maximum bandwidth at the same time; this situation is not only unlikely but also difficult to identify.

CAC Algorithm Tuning Generally

With the foregoing motivation, analysis tools and preliminary approaches, it proves useful to divide CAC tuning approaches into two categories: direct and indirect. Indirect tuning is based on measurement of parameters that are not directly transferable into effective bandwidth, and are described, for example, in the incorporated patent application entitled Model-Based Admission Control Adjustment in Data Networks.

The embodiments of the present invention described by way of illustration below fall in the category of tuning algorithms based more directly on bandwidth. Before considering these illustrative embodiments, it proves useful to consider the problem more generally.

Relevant Time-scales

One of the central time scales in illustrative embodiments of the invention is determined by the OS data collection cycle, which is advantageously fixed and is illustratively set to 15 minutes. This time scale selection can have significant consequences on the design and capabilities of CAC tuning algorithms operating in OS 150 and interacting with switches 101-i in FIG. 1. This follows because in measurement-based CAC, most relevant time scales are defined in terms of the number of accepted connections and their holding times. For example, data of this latter variety can provide statistical information about the departure time for the next one or more calls, thus providing important information about the period for which a CAC decision has to provide for particular QoS constraints. For this reason, it may be important to distinguish between PVCs and SVCs in order to avoid the possibility that the nominal bandwidth of PVCs could exceed the link capacity during CAC tuning. In particular it means that, if such possibility exists, it may be required in some cases that bandwidth available for over-booking be used only by SVCs.

Another consequence of the illustrative 15-minute update period is that several connections can leave and arrive during such an interval. Thus, in general, any measured aggregate cell rate average cannot be related directly to a particular set of connections.

The above constraints, combined with the reduction in effectiveness (resulting from over-booking) of the usual policing shield, favor non-real-time operation of CAC tuning performed in OS 150 in FIG. 1. Rather, such tuning is preferably based on a longer history of measured statistics.

"Busy Hour" Periods

Figure 5:
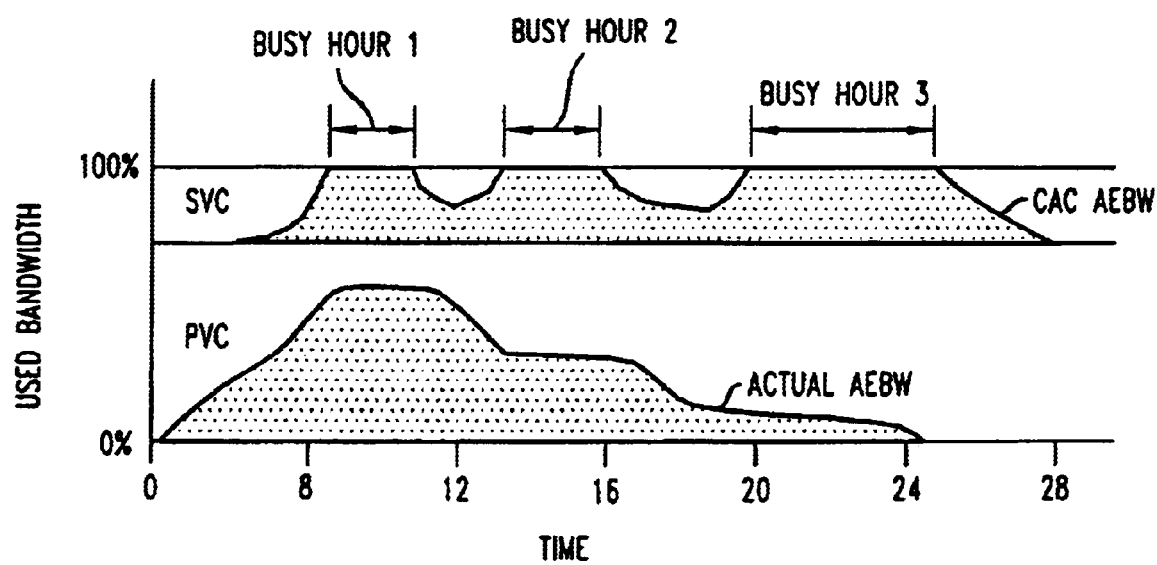
FIG. 5 illustrates the effect of "busy hour" traffic in networks such as that shown in FIG. 1.

In general, it is usually found that the most relevant measurements for CAC tuning are those made in the periods when all (or almost all) link bandwidth is allocated to connections by the normal CAC algorithm (represented by 210 in FIG. 2). We refer to such a state as a "busy period" (or "busy hour," though the duration need not be an hour). Note that busy periods can occur in different periods of the day, e.g., daytime or evening. This observation can be used to differentiate CAC tuning in different busy periods reflecting a different mix of connections and their parameters. In particular, it may occur that on average the permanent connections generated by business customers will be more prevalent during daytime, while evening hours will give rise to more switched connections originated by residential customers. This variation, illustrated in FIG. 5, may allow a higher degree of over-booking during evenings. Analogous differentiation will prove useful for different days of the week or, in some cases, seasons of the year. It is also important to identify trends—such as rapidly growing data traffic or frequent introduction of new services—and use discerned trends to modulate "overbooking" via CAC tuning.

Problem Formulation

Let us assume that based on some kind of measurement during given state of connections, k, we can calculate what is the minimum aggregate bandwidth required for this particular trace of the process, $AEBW_k^s$. Then we can calculate allowed over-booking gain for this sample state k as $$\alpha_k^{s'} = \frac{AEFB_{p,k}^{CAC}}{AEFB_k^s} - 1 \quad (1)$$

Figure 6:
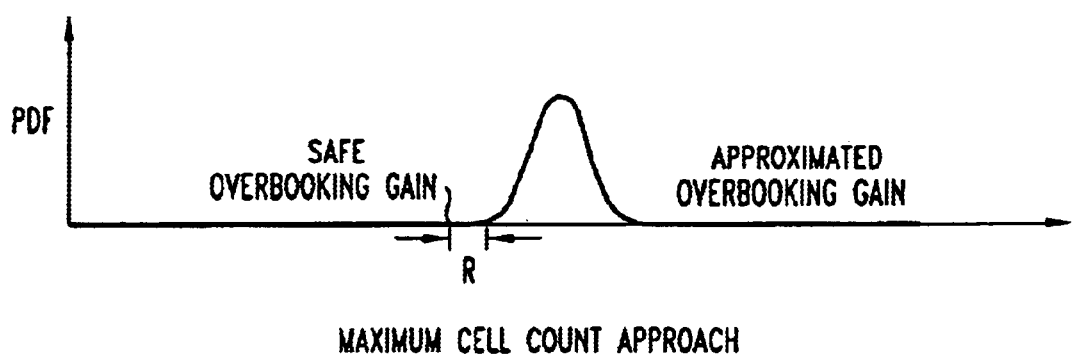
FIG. 6 show a probability density function useful in understanding the use of embodiments of the present invention.

Now we can approximate PDF of such sample over-booking gains based on a long term observations (e.g. several weeks), as illustrated in FIG. 6. This histogram can be used for calculation of the CAC over-booking gain from the following condition $$P\{\alpha_k^{s'} < \alpha^{1'} + R\} = \epsilon, \quad (2)$$

where $\epsilon$ represents the QoS requirements and R is a reservation threshold to compensate for possible PDF estimation error and long term non-stationarity of the underlying source mixes and behaviors.

An important element of the maximum cell count approach is evaluation of the aggregate effective bandwidth for given sample cell process, $AEBW_k^s$. This can be done based on a simple count of cells arriving in a periodic time slots, $c_n$, where n is the time slot index. The length of the time slot is determined by the buffer time-scale (minimum time required to fill the buffer) where the buffer size, B, is determined by the QoS constraints. The cell counts are used first to evaluate on-line a set of maximum cell counts, $C_m$, defined by $$C_m = \max_n \left\{ \sum_{k=n-m+1}^{k=n} c_k \right\}; m = 1, 2, 3, \ldots, N \quad (3)$$

This general relationship will be modified and extended in the following discussion focusing on bandwidth requirement estimation techniques employing a maximum cell count present in a network link. This bandwidth estimate is advantageously based on measurements during a large number of (usually busy hour) intervals that are used to derive a histogram approximation to the PDF for the bandwidth requirements as shown in FIG. 6.

Maximum Cell Count Model

Consider an ATM cell stream offered to an ATM link of capacity L with FIFO buffer. The required QoS is defined by maximum delay, G, and cell loss ratio, B. Based on measurements of the input cell process we want to determine actual bandwidth, $D^a$, required to serve the stream within certain period of time $[t_b, t_e]$. The period $[t_b, t_e]$ can correspond, for example, to a busy hour period. For now we assume that the arrival process starts at time $t_b$.

Let us define the buffer time scale, $T^b$, as the time required to fill the buffer of length G when the cells are generated with the maximum rate, $\lambda_{max}$. The maximum rate can be defined either by the hardware limitation of the considered system or by a sum of connection peak rates. The buffer time scale is given by $$T^b = \frac{G}{\lambda_{max} - L} \quad (4)$$

In accordance with one aspect of the present invention, an algorithm is based on a cell counter that periodically counts the cells arriving at the buffer in a sampling period $T^s$ related to $T^b$ as follows $$T^s = \frac{T^b}{I^s}, \quad (5)$$

where $I^s$ is an integer parameter of the algorithm. We will refer to a particular cell count as $c_n$, where n is the sampling period index. Now we can define maximum cell count $C_m$ as the maximum number of cells arriving in a window of length $m \cdot T^s$ in the period $[t_b, t_e]$:

$$C_m = \max_{n \in [t_b, t_c]} \left\{ \sum_{k=n-m+1}^{k=n} c_k \right\}; m = 1, 2, 3, \ldots, M, \quad (6)$$

where M is the number of sampling periods in the considered time interval $[t_b, t_e]$ The bandwidth, $B^a$, required by the cell arrival process is upper-bounded by the following expression:

$$D^a \leq D_M^{max} = \max_{3 \leq m \leq M} \left\{ D_m = \frac{(1-B)C_m - G}{(m-2)T^s + T_b} \right\}, \quad (7)$$

where $$T_\Delta = \frac{C_m - C_{m-2}}{\lambda_{max}} \quad (8)$$

The tightness of this bound can be given by $$\frac{D_M^{max} - D^a}{D_M^{max}} \leq \frac{2T^s - T_\Delta}{m_{max}T^s}, \quad (9)$$

where $m_{max}$ corresponds to m for which $\max_{3 < m < M} D_m$ is achieved.

Until this point we assumed that the maximum cell count, $C_m$, and $D_M^{max}$ correspond to the considered period of maximum queue build-up. In general, this is not the case; it may happen that the queue build-up in the period for which $D_M^{max}$ was achieved corresponds to effective bandwidth $D^{a'}$, which is smaller than $D^a$. Nevertheless the results are still valid. This follows from the fact that still $D_M^{max} \geq D^a$ since otherwise $D_M^{max}$ would be achieved for the period corresponding to $D^a$. Also the bound is still valid since $D^{a > Da'}$.

Three features associated with the above discussion that can be readily demonstrated are:

1. If there is N: 3<N<M such that $$\frac{(1-B)C_N}{NT^s} \le D_N^{\max} = \max_{3 \le m \le N}\left\{D_m = \frac{(1-B)C_m - G}{(m-2)T^s + T_\Delta}\right\} \quad (10)$$

then $$B_N^{\max} = B_M^{\max} \quad (11)$$

and, as a consequence, (7) can be substituted by $$D^a \le D_N^{\max} = \max_{3 \le m \le N}\left\{D_m = \frac{(1-B)C_m - G}{(m-2)T^s + T_\Delta}\right\} \quad (12)$$

2. If for given N: 3<N<M we have $$\frac{(1-B)C_N}{NT^s} \le D_N^{\max} = \max_{3 \le m \le N}\left\{D_m = \frac{(1-B)C_m - G}{(m-2)T^s + T_\Delta}\right\}, \quad (13)$$

then $$D^a \le D_N^{\max} \le \frac{(1-B)C_N}{NT^s} \le D^a + \frac{G}{NT^s} \quad (14)$$

3. When the measurements of bandwidth are performed in consecutive periods $[t_b, t_e]$ with the maximum window size N, the initial conditions for each period can be taken into account by modifying calculation of the maximum cell count in the following way:

$$C_m = \max_{n \in [t_b, t_e]}\left\{\delta_{m,n} + \sum_{k=n-m+1}^{k=n} c_k\right\}; m = 1, 2, 3, \ldots, N \quad (15)$$

where $(\delta_{m,n} = \min\{G, C_N^{old} - c_n^m\}$ for m=N, n=$\min_{n \in [t_b, t_e]}$n and $\delta_{m,n} = 0$ otherwise. Here, n denotes maximum cell count from the previous period for window m and $C_m^{old}$ denotes maximum cell count from the previous period for window m and $$c_n^m = \sum_{k=n-m+11}^{k=n} c_k.$$

Implementation of Illustrative Maximum Cell Count Algorithms

Implementation of the maximum cell count algorithm can be considered in two time scales associated with the sampling period $T^s$ and the measurement period, $[t_b, t_e]$, respectively. In the fast time scale the maximum cell counts are calculated after each new count sample. Here the input parameters are sampling period $T^s$ and maximum window size N. The choice of these parameters should take into account the trade-off between complexity of calculations and accuracy. In particular, the smaller $T^s$ and the larger $NT^s$ the better accuracy is achieved as shown by Eqs. (9,14). Nevertheless, it is clear that above certain values the gain can be small and not worth the additional complexity introduced by increased speed of calculations and increased number of maximum counts.

At the end of each measurement period the measured effective bandwidth bound is calculated using either Eq. (12) or Eq. (14), depending on which of the conditions of Eqs. (10) or (13) is satisfied. Also, the value of $\delta_{N,n}$ is calculated for the next sampling period to be added to the first count of window N in the new measurement period according to Eq. (15). Once this is done all maximum counts are set to zero and a new measurement period is started. Note that the effective bandwidth calculation is not time sensitive since the measurement period is rather large (at least in order of tens of minutes) and the maximum cell count values can be stored in the memory. The choice of the measurement period depends on application and can vary from 15 minutes to hours or days.

FIG. 7 shows an illustrative architecture for practicing embodiments of the present invention. There, the normal CAC model 710 at a switch receives policing parameters specifying traffic characteristics on input 700 from users, other network switches, or other network elements. Without use of presently disclosed inventive principles, CAC 710 determines effective bandwidth in the normal (usually conservative) way and produces the resultant effective bandwidth as output 720. This result is then used to inform the CAC decision at 770.

In accordance with embodiments of the present invention, an effective bandwidth adjustment is made in block 725 of FIG. 7. This adjustment, in turn is effected by the overbooking gain determined at a network OS in response to the above-described cell count measurements and resulting estimation of the PDF for the effective bandwidth. The overbooking gain evaluator 740 is shown in FIG. 7 as receiving the maximum cell counts from block 730 at the switch as well as the (non-adjusted) effective bandwidth determined by CAC model 710. In some embodiments, it proves valuable to include a safety model 750 in the OS determinations to modulate overbooking gain before application to effective bandwidth adjustment block 725. This safety model may be used to affect the overbooking gain by an operator input or by an algorithmic reduction of overbooking by a constant amount or percentage.

Generalization to Multi-Priority Systems

Thus far, it has been assumed that an ATM switch output port has one priority queue and that at least one 15-minute interval during the "busy hour" period the full bandwidth capacity is used. In maximum cell count-based solutions based on principles of the present invention, QoS violations will generally appear first for low priority services, even though a violation may be caused by a too-large overbooking of high priority services.

In considering how overbooking gain should be distributed between or among connections for different priorities/services, a plurality of particular approaches may be adopted. In accordance with one technique, a simplified analytical model fed by measured basic parameters of traffic having respective priorities. Average rate per service is one such example.

An alternative approach to distributing overbooking gain employs prior experience with services and related cell traffic. Analyses of data relating to such prior behavior indicate such factors as failure to fully use provisioned bandwidth. It will be recognized, however, that very accurate apportionment of overbooking is not generally required because QoS is still under the control of the tuning process.

Other particular overbooking gain distributions will occur to those skilled in the art in light of particular requirements or operating conditions. In some cases, e.g., it proves advantageous to group services and apply a given apportionment of overbooking gain to each of a plurality of such groups. Similarly, it will prove convenient to further apportion a group apportionment of overbooking gain between particular categories of services or between individual services in the respective groups. Further hierarchical apportionments may prove useful in particular cases.

Complementary Features of Various Algorithms

As will be appreciated by those skilled in the art, the CAC tuning systems and methods described in the present application, and those described in the incorporated patent applications, are complementary in many ways and can be used cooperatively to improve the overall tuning result. For example the learning-based techniques described in the incorporated application entitled Learning-Based Admission Control Adjustment in Data Networks can be used in combination with teachings of the present maximum cell count methods.

Numerous and varied other methods and systems for tuning CAC performance in ATM networks within the scope and spirit of the present invention will occur to those skilled in the art in light of the present teachings.

While the term Connection Admission Control has been associated with the acronym CAC, this acronym is also used with the term Call Admission Control; such different usage connotes no difference of meaning in application of the present invention—the two terms may be used interchangeably. In each case the reference is to the admission, or not, of new (or renegotiated) virtual connections.

While ATM systems have been used to illustrate the principles of the present invention, those skilled in the art will find application of these teachings in other particular admission control contexts. Likewise, though estimates of required bandwidth have been carried out at operations systems in the described embodiments, it will be recognized that some or all of these functions may be performed in a distributed manner in a network, including functions performed at switches.

What is claimed is:

1. In a packet communications network comprising at least one packet switch, said switch having a plurality of input ports and a plurality of output ports, a method for estimating the bandwidth required for a link connected to one of said ports through a FIFO buffer, the method comprising for each of a plurality of sampling windows, measuring the count of the number of cells arriving at said buffer, determining the maximum count for all sampling windows occurring during a measurement period of duration at least equal to said sampling window, determining an estimate of the bandwidth required by said link based on said maximum count, wherein said buffer has delay G, said link has a capacity L, and required Quality of Service (QoS) for said link comprises a maximum delay, G, and a cell loss ratio B, wherein said cells arriving at said buffer arrive with a maximum rate, $\lambda_{max}$, and wherein said sampling window is of duration $mxT^s$, where $$T^s = \frac{T^b}{I^s},$$

$I^s$ is an integer, and $$T^b = \frac{G}{\lambda_{max} - L}.$$

2. The method of claim 1 wherein said maximum cell count in said window is $$C_m = \max_{n \in [t_b, t_c]} \left\{ \sum_{k=n-m+1}^{k=n} c_k \right\};$$

m=1,2,3, ..., M, where M is the number of multiples of $T^s$ in said measurement period.

3. The method of claim 2 wherein said determining of an estimate of said required bandwidth, $D^a$, is upper-bounded by $$D^a \leq D_M^{max} = \max_{3 \leq m \leq M} \left\{ D_m = \frac{(1-B)C_m - G}{(m-2)T^s + T_\Delta} \right\}, \text{ where } T_\Delta = \frac{C_m - C_{m-2}}{\lambda_{max}}.$$

4. The method of claim 2 wherein if there is N: 3<N<M such that $$\frac{(1-B)C_N}{NT^s} \leq D_N^{max} = \max_{3 \leq m \leq N} \left\{ D_m = \frac{(1-B)C_m - G}{(m-2)T^s + T_\Delta} \right\},$$

said determining of an estimate of said required bandwidth, $D^a$, is upper-bounded by $$D^a \leq D_N^{max} = \max_{3 \leq m \leq N} \left\{ D_m = \frac{(1-B)C_m - G}{(m-2)T^s + T_\Delta} \right\},$$

where $$T_\Delta = \frac{C_m - C_{m-2}}{\lambda_{max}}.$$

5. The method of claim 2 wherein if for given $$N:3 < N < M, \frac{(1-B)C_N}{NT^s} > D_N^{max} = \max_{3 \leq m \leq N} \left\{ D_m = \frac{(1-B)C_m - G}{(m-2)T^s + T_\Delta} \right\}, \text{ then}$$

$$D^a \leq D_N^{max} \leq \frac{(1-B)C_N}{NT^s} \leq D^a + \frac{G}{NT^s}.$$

6. In a packet communications system, a method for adjusting a connection admission control (CAC) process for a port at a switch, said port being connected to a communications link through a FIFO buffer, the method comprising for each of a plurality of measurement periods, for each of a plurality of sampling windows, measuring the count of the number of cells arriving at said buffer, determining the maximum count for all sampling windows occurring during a measurement period of duration at least equal to said sampling window, determining an estimate of the bandwidth required by said link based on said maximum count, determining an overbooking gain based on a probability distribution function (PDF) of said estimates for said plurality of measurement periods, adjusting said CAC process at said port based on said overbooking gain.

7. The method of claim 6 wherein said packet communications switch is a cell communications switch operating in accordance with one or more ATM protocols.

8. The method of claim 6 wherein said adjusting comprises increasing bandwidth available for allocation to connections at said port while a quality of service (QoS) requirement is not violated at said port.

9. The method of claim 6 wherein said estimating is performed in an operations system (OS) serving at least one switch.

10. The method of claim 6 wherein said measurement periods are each of duration sufficient to permit the exit and entry of a plurality of connections through said port.

11. The method of claim 6 wherein said measurement periods are each of duration substantially equal to 15 minutes.

12. The method of claim 6 wherein said buffer has delay G, said link has a capacity L, and required Quality of Service (QoS) for said link comprises a maximum delay, G, and a cell loss ratio B.

13. The method of claim 12 wherein said cells arriving at said buffer arrive with a maximum rate, $\lambda_{max}$.

14. The method of claim 13 wherein $\lambda_{max}$ is the peak rate for the sum of all connections on said link.

15. The method of claim 13 wherein said sampling window is of duration $m \times T^s$, where $$T^s = \frac{T^b}{I^s},$$

$I^s$ is an integer, and $$T^b = \frac{G}{\lambda_{max} - L}.$$

16. The method of claim 15 wherein said maximum cell count in said window is $$C_m = \max_{n \in [t_b, t_c]} \left\{ \sum_{k=n-m+1}^{k=n} c_k \right\};$$

$m = 1, 2, 3, \ldots, M$, where M is the number of multiples of $T^s$ in said measurement period.

17. The method of claim 16 wherein said determining of an estimate of said required bandwidth, $B^a$, is upper-bounded by $$D^a \leq D_M^{max} = \max_{3 \leq m \leq M} \left\{ D_m = \frac{(1-B)C_m - G}{(m-2)T^s + T_\Delta} \right\}, \text{ where } T_\Delta = \frac{C_m - C_{m-2}}{\lambda_{max}}.$$

18. The method of claim 15 wherein if there is N: 3<N<M such that $$\frac{(1-B)C_N}{NT^s} \leq D_N^{max} = \max_{3 \leq m \leq N} \left\{ D_m = \frac{(1-B)C_m - G}{(m-2)T^s + T_\Delta} \right\},$$

said determining of an estimate of said required bandwidth, $B^a$, is upper-bounded by $$D^a \leq D_N^{max} = \max_{3 \leq m \leq N} \left\{ D_m = \frac{(1-B)C_m - G}{(m-2)T^s + T_\Delta} \right\},$$

where $$T_\Delta = \frac{C_m - C_{m-2}}{\lambda_{max}}.$$

19. The method of claim 15 wherein for $$N: 3 < N < M, D^a \leq D_N^{max} \leq \frac{(1-B)C_N}{NT^s} \leq D^a + \frac{G}{NT^s}.$$

20. In a connection-based packet communications network, a system comprising at least one switch, each of said switches comprising a plurality of input ports and a plurality of output ports,
a connection admission control (CAC) system for controlling the admission of connections through said switch, said connections characterized by at least one policing parameter,
means for estimating the bandwidth required for a link connected to at least some of said ports through a FIFO buffer comprising
means for measuring the count of the number of cells arriving at respective ones of said buffers, for each of a plurality of sampling windows,
means for determining the maximum count at respective ones of said buffers for all sampling windows occurring during a measurement period of duration at least equal to said sampling window,
means for determining an estimate of the bandwidth required by respective ones of said links based on said maximum count, further comprising
means for determining an overbooking gain for each port of each of said switches, said determining based on said estimate of bandwidth required by links at respective ones of said ports in respective ones of said switches, said determining further based on said at least one policing parameter for said respective ones of said ports in respective ones of said switches, and
means for adjusting said CAC system for each of said ports in each of said switches in accordance with said overbooking gain.

21. In a connection-based packet communications network, a system comprising at least one switch, each of said switches comprising a plurality of input ports and a plurality of output ports,
a connection admission control (CAC) system for controlling the admission of connections through said switch, said connections characterized by at least one policing parameter,
means for estimating the bandwidth required for a link connected to at least some of said ports through a FIFO buffer comprising
means for measuring the count of the number of cells arriving at respective ones of said buffers, for each of a plurality of sampling windows,
means for determining the maximum count at respective ones of said buffers for all sampling windows occurring during a measurement period of duration at least equal to said sampling window,
means for determining an estimate of the bandwidth required by respective ones of said links based on said maximum count,
wherein said buffer has delay G, said link has a capacity L, and required Quality of Service (QoS) for said link comprises a maximum delay, G, and a cell loss ratio B, wherein said cells arriving at said buffer arrive with a maximum rate, $\lambda_{max}$, wherein $\lambda_{max}$ is the peak rate for the sum of all connections on said link, and wherein said sampling window is of duration $m \times T^s$, where $$T^s = \frac{T^b}{I^s},$$

$I^s$ is an integer, and $$T^b = \frac{G}{\lambda_{max} - C}.$$

22. The system of claim 21 wherein said maximum cell count in said window is $$C_m = \max_{n \in [t_b, t_c]} \left\{ \sum_{k=n-m+1}^{k=n} c_k \right\};$$

$m = 1, 2, 3, \ldots, M$, where M is the number of multiples of $T^s$ in said measurement period.

23. The system of claim 22 wherein said determining of an estimate of said required bandwidth, $D^a$, is upper-bounded by $$D^a \le D_M^{max} = \max_{3 \le m \le M} \left\{ D_m = \frac{(1-B)C_m - G}{(m-2)T^s + T_\Delta} \right\}, \text{ where } T_\Delta = \frac{C_m - C_{m-2}}{\lambda_{max}}.$$

24. The system of claim 22 wherein if there is N: $3 < N < M$ such that $$\frac{(1-B)C_N}{NT^s} \le D_N^{max} = \max_{3 \le m \le N} \left\{ D_m = \frac{(1-B)C_m - G}{(m-2)T^s + T_\Delta} \right\},$$

said determining of an estimate of said required bandwidth, $D^a$, is upper-bounded by $$D^a \le D_M^{max} = \max_{3 \le m \le M} \left\{ D_m = \frac{(1-B)C_m - G}{(m-2)T^s + T_\Delta} \right\}, \text{ where } T_\Delta = \frac{C_m - C_{m-2}}{\lambda_{max}}.$$

25. The system of claim 22 wherein if for N: $3 < N < M$, $\frac{(1-B)C_N}{NT^s} > D_N^{max} = \max_{3 \le m \le N} \left\{ D_m = \frac{(1-B)C_m - G}{(m-2)T^s + T_\Delta} \right\}$, then $$D^a \le D_N^{max} \le \frac{(1-B)C_N}{NT^s} \le D^a + \frac{G}{NT^s}.$$

* * * * *

UNITED STATES PATENT AND TRADEMARK OFFICE
CERTIFICATE OF CORRECTION

PATENT NO. : 6,697,369 B1
DATED : February 24, 2004
INVENTOR(S) : Zbigniew Marek Dziong and Wing Cheong Lau It is certified that error appears in the above-identified patent and that said Letters Patent is hereby corrected as shown below:

<u>Title page</u>,
Insert Item:
-- [73]   Assignee: Lucent Technologies Inc., Murray Hill, N.J. --

Signed and Sealed this

Thirty-first Day of August, 2004

JON W. DUDAS
*Director of the United States Patent and Trademark Office*